United States Patent
Enomoto et al.

(10) Patent No.: US 6,490,078 B2
(45) Date of Patent: Dec. 3, 2002

(54) OPTICAL FIBER FOR OPTICAL AMPLIFIER, OPTICAL FIBER AMPLIFIER AND OPTICAL FIBER LASER

(75) Inventors: Tadashi Enomoto, Yokohama (JP); Masahiro Takagi, Yokohama (JP); Yuichi Ohga, Yokohama (JP); Motoki Kakui, Yokohama (JP); Shinji Ishikawa, Yokohama (JP); Masakazu Shigehara, Yokohama (JP); Shinji Endo, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/809,301

(22) Filed: Mar. 16, 2001

(65) Prior Publication Data

US 2001/0026396 A1 Oct. 4, 2001

(30) Foreign Application Priority Data

Mar. 16, 2000 (JP) ........................................ 2000-074523

(51) Int. Cl.[7] .............................. G02B 6/34; H01S 3/30; H04B 10/12
(52) U.S. Cl. ................................ 359/341.1; 359/341.3; 385/37; 372/6
(58) Field of Search ........................... 359/341.1, 341.3; 385/37; 372/6

(56) References Cited

U.S. PATENT DOCUMENTS

| | | | | |
|---|---|---|---|---|
| 4,923,279 A | * | 5/1990 | Ainslie et al. | 372/6 |
| 5,121,460 A | * | 6/1992 | Tumminelli et al. | 372/6 |
| 5,491,581 A | * | 2/1996 | Roba | 359/337.3 |
| 5,530,709 A | * | 6/1996 | Waarts et al. | 372/6 |

(List continued on next page.)

FOREIGN PATENT DOCUMENTS

| | | |
|---|---|---|
| EP | 60200208 | 10/1985 |
| EP | 0 320 990 | 6/1989 |
| EP | 0 829 740 A2 * | 3/1998 |
| EP | 0 867 986 | 9/1998 |
| EP | 0 905 834 A2 * | 3/1999 |
| EP | 11202139 | 7/1999 |
| JP | 10-104460 * | 4/1998 |

OTHER PUBLICATIONS

Miyazaki, T. et al. "Nd–Doped Double Clad Fiber Amplifier at 1.06 um." J. Lightwave Tech. 16:4, Apr. 1998, pp. 562–566.*

(List continued on next page.)

Primary Examiner—Thomas H. Tarcza
Assistant Examiner—Andrew R. Sommer
(74) Attorney, Agent, or Firm—McDermott, Will & Emery

(57) ABSTRACT

The present invention relates to an OFA having a high signal gain, easily manufactured, having a high mechanical strength, having a small splice loss with respect to other optical fibers, and rarely encountering the occurrence of noise at a signal wavelength. The OFA according to the present invention has a function of amplifying signals propagating therethroug by pumping light supplied thereto, and comprises, at least, a core region, an inner cladding region provided on the periphery of the core region, an outer cladding region provided on the periphery of the inner cladding region, and one or more node coupling gratings. An element for signal amplification is added to at least the core region. The core region has a structure ensuring a core mode with respect to the signals, while the inner cladding region has a structure ensuring a multi-mode with respect to the pumping light. Each of the mode coupling gratings passes core mode signals therethrough, and induces a mode coupling between the inner cladding mode and the core mode with respect to the pumping light.

12 Claims, 7 Drawing Sheets

U.S. PATENT DOCUMENTS

| | | | |
|---|---|---|---|
| 5,703,978 A | | 12/1997 | DiGiovanni et al. ............ 385/37 |
| 5,708,669 A | | 1/1998 | DiGiovanni et al. ............. 372/6 |
| 5,710,786 A | | 1/1998 | Mackechnie et al. ........... 372/6 |
| 5,740,292 A | * | 4/1998 | Strasser ........................... 372/6 |
| 5,864,645 A | | 1/1999 | Zellmer et al. .............. 385/126 |
| 5,898,715 A | * | 4/1999 | LeGrange et al. .............. 372/6 |
| 5,920,582 A | * | 7/1999 | Byron ......................... 372/102 |
| 5,933,437 A | * | 8/1999 | Delavaux ......................... 372/6 |
| 5,937,134 A | * | 8/1999 | DiGiovanni .................... 372/6 |
| 5,966,491 A | * | 10/1999 | DiGiovanni .................... 372/6 |
| 6,084,996 A | * | 7/2000 | Judkins et al. ................. 385/37 |
| 6,151,429 A | * | 11/2000 | Kristensen et al. ............ 385/11 |
| 6,221,555 B1 | * | 4/2001 | Murakami et al. ........... 385/127 |
| 6,240,108 B1 | * | 5/2001 | Ionov .............................. 372/6 |
| 6,263,003 B1 | * | 7/2001 | Huang et al. ............. 359/341.3 |
| 6,288,835 B1 | * | 9/2001 | Nilsson et al. ............ 359/341.3 |
| 6,307,994 B1 | * | 10/2001 | Paek et al. ................... 385/127 |
| 6,337,937 B1 | * | 1/2002 | Takushima et al. ............ 385/28 |
| 6,392,789 B1 | * | 5/2002 | Paek et al. ............. 359/337.21 |

OTHER PUBLICATIONS

Po, H. et al. "High Power Neodymium–Doped Single Transverse Mode Fibre Laser." Elect. Lett. 29:17, Aug. 1993, pp.1500–1501.*

Hill, K.O. et al. "Efficient Mode Conversion in Telecommunication Fibre Using Externally Written Gratings." Elect. Lett 26:16, Aug. 1990, pp. 1270–1272.*

* cited by examiner

OPTICAL FIBER FOR OPTICAL AMPLIFIER, OPTICAL FIBER AMPLIFIER AND OPTICAL FIBER LASER

BACKGROUND OF THE INVENTION

1. Field of the Invention

The invention relates to an optical fiber amplifier, an optical fiber laser, and an optical fiber for optical amplifier (OFA) applicable thereto as an optical amplification medium.

2. Related Background Art

An optical fiber for optical amplifier (OFA) has a function of amplifying signals propagating therethrough by pumping light supplied thereto, and is an optical device applicable as an optical amplification medium in an optical fiber amplifier, an optical fiber laser, and the like. In general, an OFA is a silica-based optical fiber and has a core region doped with a luminescent element for signal amplification. As this luminescent element, for example, a rare earth element, preferably Er can be used. An OFA to which Er, as a luminescent element, is added can amplify signals of a wavelength band of 1.55 μm when pumping light of a wavelength of 1.48 μm or 0.98 μm is supplied thereto. In such an OFA, increasing a signal gain is important, and some kinds of techniques for meeting this requirement have been proposed.

For example, an OFA disclosed as a conventional technology in Japanese Patent Laid-Open No. 135548/1998 (Document 1) has a core region having a refractive index of $n_1$, an inner cladding region provided on the periphery of the core region and having a refractive index $n_2$ ($<n_1$), and an outer cladding region provided on the periphery of the inner cladding region and having a refractive index $n_3$ ($<n_2$). The core region is doped with a luminescent element. This optical fiber makes the pumping light propagate as light of an inner cladding mode (a mode in which the pumping light propagates while being confined in both the core region and inner cladding region), and makes signals as light of a core mode (a mode in which the signals propagate while being supported in the core region). Such an OFA will hereinafter be referred to as a cladding-pumped fiber.

Japanese Patent Laid-Open No 238883/1991 (Document 2) discloses a structure suitable for above-mentioned cladding-pumped fiber. It is described that, in this cladding-pumped fiber, pumping light can propagated as an inner cladding mode light, so that a coupling efficiency of the pumping light in the fiber is high. Further, since the pumping light also propagates through an inner cladding region containing no luminescent element and a transmission loss of the pumping light is small, a gain efficiency can be improved.

A cladding-pumped fiber disclosed in International Laid-open Publication PCT/EP96/04187 (Document 3) works to induce a mode coupling between an inner cladding mode and a core mode with respect to pumping light by employing a non-circular cross-sectional shape to the inner cladding region. Concerning the pumping light introduced into this cladding-pumped fiber, the inner cladding mode is more effectively coupled to the core modes, and a gain efficiency is thereby increased to a high level.

Further, in a cladding-pumped fiber disclosed in Japanese Patent Laid-Open No. 107345/1998 (Document 4), signals propagate with not only light of a fundamental mode (core mode) but also that of a high-order mode while being confined in a core region, and a signal gain is thereby increased only light of the fundamental mode is outputted to outside by a grating cutting of that of the high-order mode.

SUMMARY OF THE INVENTION

The inventors discussed the above-mentioned prior techniques to discover the following problems. Namely, in the cladding-pumped fiber of Documents 1 and 2, the pumping light of inner cladding mode cannot effectively pump the luminescent element added to the core region, thereby the increasing of a signal gain could not be sufficiently attained. It is difficult to control the manufacturing of a cladding-pumped fiber having a non-circular cross-sectional shape of an inner cladding region, and further the mechanical strength of such optical fiber is liable to decrease.

In the cladding-pumped fiber of Documents 3 and 4 through which signals propagate with not only light of a fundamental mode but also that of a high-order mode while being supported in a core region, it is difficult to completely cut off the high-order mode light by a grating. The leakage high-order light induces a high noise figure. Moreover, a splice loss between this cladding-pumped fiber and another optical fiber becomes large, and the pumping of the high-order mode occurs in the latter optical fiber, this matter also constitutes a noise figure.

The present invention has been accomplished to solve the above-mentioned problems, and an object of the present invention is to provide an OFA having a high gain efficiency, capable of being manufactured easily, having a high mechanical strength, not inducing a large splice loss with respect to any other optical fiber, and not inducing noise in a signal wavelength, an optical fiber amplifier and an optical fiber laser to both of which said OFA can be applied as an optical amplification medium.

An OFA according to the present invention is a silica-based optical fiber having a function of amplifying signals when pumping light is supplied thereto, and comprises a core region having a refractive index $n_1$, an inner cladding region provided on the periphery of the core region and having a refractive index $n_2(<n_1)$, and an outer cladding region provided on the periphery of the inner cladding region and having a refractive index $n_3(<n_2)$. The core region has a structure ensuring a single mode with respect to the signals, and the inner cladding region has a structure ensuring a multi-mode with respect to the pumping light. A signal amplifying luminescent element is aided to at least a part of the core region.

In particular, the OFA according to the present invention comprises one or more mode coupling gratings, each allowing core mode light to pass therethrough and inducing a mode coupling between an inner cladding mode and a core mode with respect to the pumping light.

In the OFA, the pumping light initially introduced thereinto propagates as light of an inner cladding mode, and the inner cladding mode is then converted into a core mode by a mode coupling effect of the mode coupling grating. The pumping light of the core mode pumps the luminescent element added to at least the part of the core region of the OFA. On the other hand, signals propagate as light of the core mode and pass through the mode coupling grating while remaining its mode. Consequently, amplified signals are obtained from the OFA.

At least one of mode coupling gratings in the OFA according to the present invention may include a long-period grating which induces a mode coupling between an inner cladding mode and a core mode whose propagation direction is identical with that of the inner cladding mode. In this case, the period of the long-period grating is preferably 10 μm–400 μm. When the pumping light reaches a long-period grating, the inner cladding mode is converted into a core mode whose propagation direction is identical with that of the inner cladding mode by the mode coupling effect of the mode coupling grating.

At least one of mode coupling gratings in the OFA according to the present invention may include a tilted fiber Bragg grating which induces a mode coupling between an inner cladding mode and a core mode whose propagation direction is contrary to that of the inner cladding mode. In this case, an angle of inclination of the tilted fiber Bragg grating with respect to a predetermined axis, for example, an optical axis is preferably 0.5°–20°. When the pumping light reaches the tilted fiber Bragg grating, the inner cladding mode is converted into a core mode whose propagation direction is contrary to that of the inner cladding node by the mode coupling effect of this tilted fiber Bragg grating.

As clearly disclosed in U.S. Pat. No. 5,703,978, a long-period grating is a grating inducing a mode coupling between a core mode and a cladding mode propagating through an optical fiber, and clearly distinguished from a fiber Bragg grating which reflects light of around a predetermined wavelength without inducing a rode coupling. In a long-period grating, a grating period is so set that a phase difference between a core mode and a cladding mode becomes 2π in order to obtain strong power conversion from the core mode into the cladding mode. Therefore, since the long-period grating works so as to couple the core mode with the cladding mode, the core mode attenuates over a narrow band around a predetermined wavelength (which will hereinafter be referred to as a loss wavelength).

The optical fiber amplifier according to the present invention comprises an OFA having the above-mentioned mode coupling grating (OFA according to the present invention), and one or more pumping light sources supplying pumping light to the OFA. In accordance with the optical fiber amplifier, a high gain is obtained because the OFA is employed as a signal amplifying optical amplification medium.

When the optical fiber amplifier comprises pumping light sources each supplying pumping light of wavelengths different from each other, it is preferable that the optical fiber for optical amplifier includes fiber Bragg gratings, which selectively reflect light of a predetermined wavelength, arranged so as to sandwich the one or more mode coupling gratings. Each of the fiber Bragg gratings may includes either a Bragg grating reflecting light of a specific wavelength without inducing a mode coupling, or a tilted Bragg grating inclined at a predetermined angle with respect a predetermined axis and having a mode coupling effect.

The optical fiber laser according to the present invention comprises an OFA having the above-mentioned structure (OFA according to the present invention), one or more pumping light sources each supplying pumping light to the OFA, and a resonator resonating signals amplified by the OFA. The resonator in the optical fiber laser may constituted by a Fabry-Perot resonator or a ring type resonator. In accordance with such an optical fiber laser, a high laser oscillation efficiency is obtained by the application of the OFA as an optical amplification medium for amplifying signals (induced emission light). In the optical fiber laser, the pumping light sources may also has structures which supply pumping light of wavelengths different from each other. In this case, it is preferable that the OFA comprises fiber Bragg gratings, selectively reflect light of a predetermined wavelength, arranged so as to sandwich the one or more mode coupling gratings. Each of the fiber Bragg gratings may include either a Bragg grating reflecting light of a specific wavelength without inducing a mode coupling, or a tilted Bragg grating inclined at a predetermined angle with respect to a predetermined axis and having a mode coupling effect.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1A:
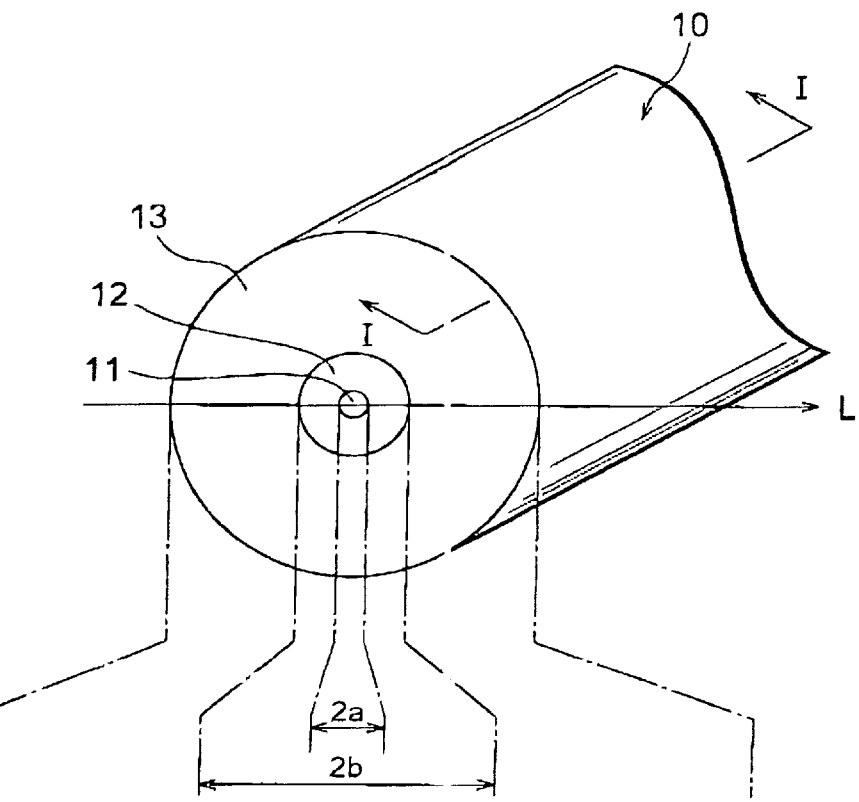
FIGS. 1A and 1B are sectional views of the OFA according to the present invention, and a refractive index profile thereof.

Each embodiment of the OFA, optical fiber amplifier and fiber optic laser resonator according to the present invention will now be described with reference to FIGS. 1A, 1B, 2, 3A–3E and 4–12. In the description of the drawings, the same elements will be designated by the same reference numerals and symbols, and the duplication of descriptions will be omitted.

FIG. 1 is a diagram showing the structure in section of the OFA 10 according to the present invention. This OFA 10 comprises a core region 11 extending along a predetermined axis, for example, an optical axis, an inner cladding 12 provided on the periphery of the core region, and an outer cladding 13 provided on the periphery of the inner cladding 12. The core region 11 has a refractive index $n_1$, and an outer diameter $2a$. The inner cladding 12 has a refractive index $n_2$ lower than the refractive index $n_1$, and an outer diameter $2b$. The outer cladding 13 has a refractive index $n_3$ lower than the refractive index $n_2$. The OFA 10 is a cladding-pumped fiber which is capable of amplifying signals when the pumping light is supplied thereto, and it makes the signals propagate as light of a core mode and makes the pumping light propagate as light of a core mode or an inner cladding mode. In order to satisfy, such conditions, the refractive index and outer diameter of each glass region of the optical fiber for optical amplifier 10 are suitably set.

Figure 1B:
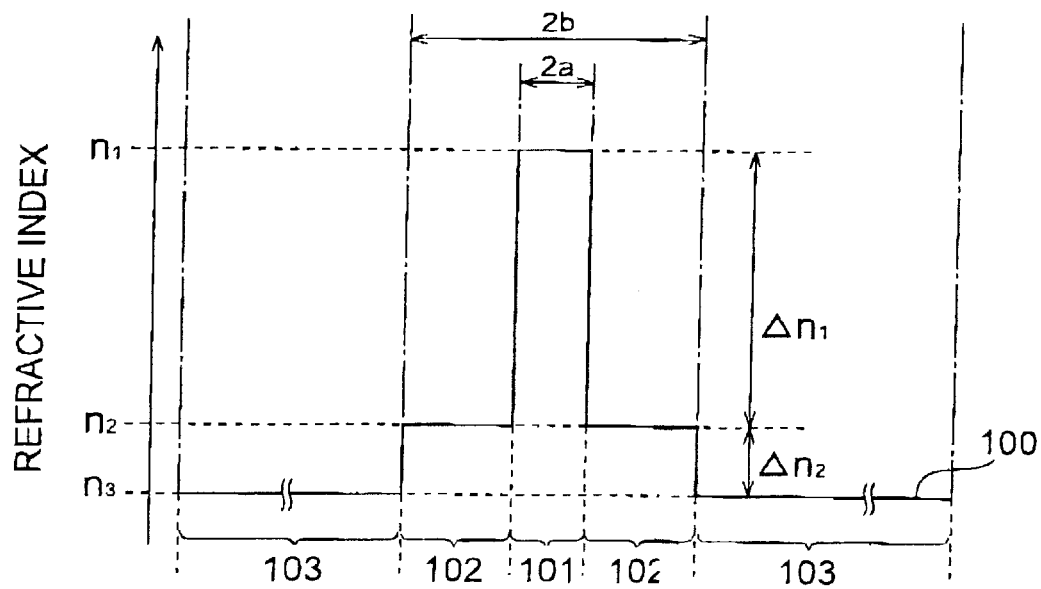

A refractive index profile 100 shown in FIG. 1B indicates a refractive index of each point on a line L in FIG. 1A. A region 101 represents a refractive index of the core region 11 on the line L, a region 102 a refractive index of the inner cladding 12 on the line L, and a region 103 a refractive index of the outer cladding 13 on the line L respectively.

At least a part of the core region 11 of the OFA 10 is doped with a luminescent element for signal amplification. The luminescent element thus doped is preferably a rare earth element and a transition element, and, above all, Er is suitable. When Er is added as a luminescent element, a wavelength band of the pumping light is 0.98 $\mu$m or 1.48 $\mu$m, and an amplifiable signal wavelength band is 1.52 $\mu$m–1.63 $\mu$m. The luminescent element may be added to the entire core region of the OFA 10, or only a part (for example, a region in the vicinity of the optical axis) of the core region, or not only the core region but also the inner clad region. The luminescent element may be added to the OFA 10 over the whole length thereof, or to a part thereof extending in the longitudinal direction of the optical fiber 10.

For example, the OFA 10 includes a silica-based optical fiber having the core 11 doped with $GeO_2$ and Er, the inner cladding region 12 doped with F, and the outer cladding region 13 doped with F (the concentration of which is higher than that of F in the inner cladding region 12). Al and P may further be added to the core region 11. An element for refractive index adjustment (for example, Cl and B) may also be added to each glass region. The Er may be added not only to the core region but also to the inner cladding region 12. The Er may also be added to only a part of the core region.

To be more exact, outer diameters $2a$, $2b$ of the core region 11 and the inner cladding region 12 are set to 4 $\mu$m and 35 $\mu$m, respectively, and an outer diameter of the outer cladding region 13 to a standard level of 125 $\mu$m. A relative refractive index difference $\Delta n_1 (=(n_1^2-n_2^2)/2n_2^2)$ of the core region 11 with respect to the inner cladding region 12 is set to 1.3%, and that $\Delta n_2 (=(n_2^2-n_3^2)/2r_2^2)$ of the outer cladding region 13 with respect thereto 0.35%. The OFA thus designed allows the signals in a 1.55 $\mu$m wavelength band to propagate as light of the core mode, and allows the pumping light propagate as light of the core mode or the inner cladding mode.

Figure 2:
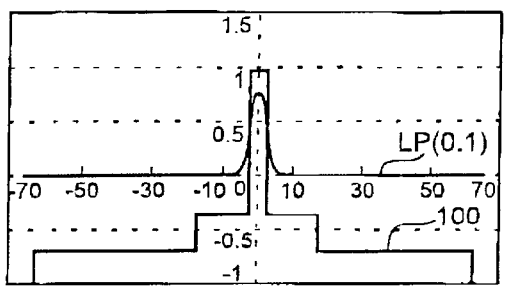
FIG. 2 is a diagram showing electromagnetic field distribution of a fundamental mode LP(0, 1)(core mode) of signals (wavelength of 1.55 μm)

Namely, the OFA 10 designed as mentioned above ensures the propagation of signals of a wavelength of 1.55 $\mu$m in a fundamental mode LP (0, 1) (core mode) as shown in FIG. 2, which shows electromagnetic field distribution of the signal (wavelength of 1,55 $\mu$m) in the fundamental mode LP(0, 1).

Figure 3A:
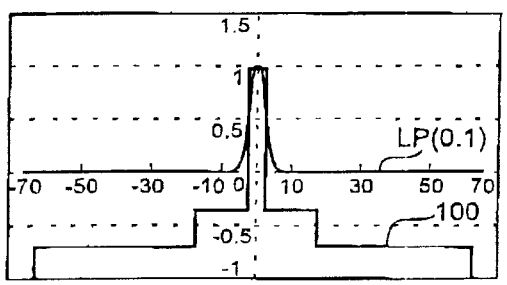
FIGS. 3A–3E are diagrams showing electromagnetic field distribution of a fundamental mode LP(0, 1) (core mode) and a high-order modes (LP(0, 1)–LP(0,5)) of the pumping light (wavelength of 0.98 μm)
Figure 3B:
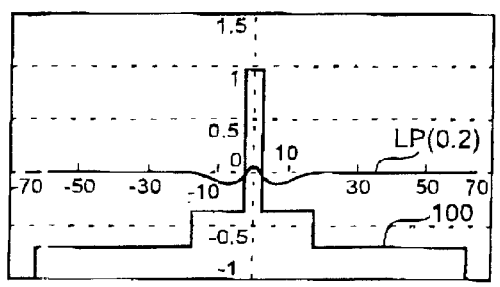
Figure 3C:
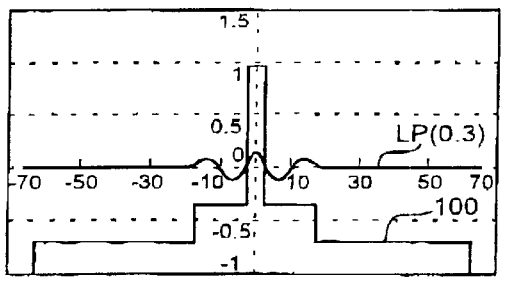
Figure 3D:
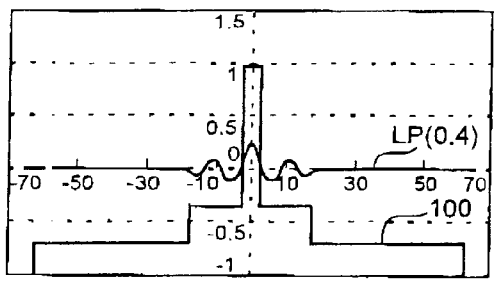
Figure 3E:
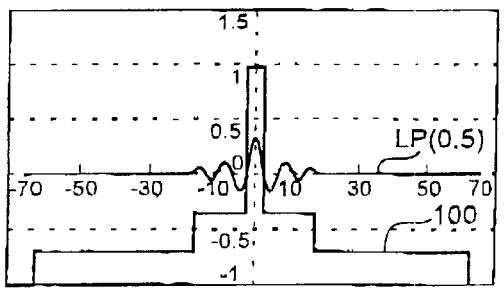

The OFA 10 ensures the propagation of the pumping light as well in the fundamental mode LP (0,1) (core mode) as shown in FIG. 3A, and also in a high-order mode (LP (0, 2)–LP(0, 5)) as shown in FIGS. 3B–3E. FIG. 3B shows a secondary inner cladding mode LP(0, 2) with respect to the pumping light, FIG. 3C a tertiary inner cladding mode LP(0, 3) with respect to the same light, FIG. 3D a quaternary inner cladding mode LP(0, 4) with respect to the same light, and FIG. 3E a quinary inner cladding mode LP(0, 5) with respect to the same light.

Figure 4:
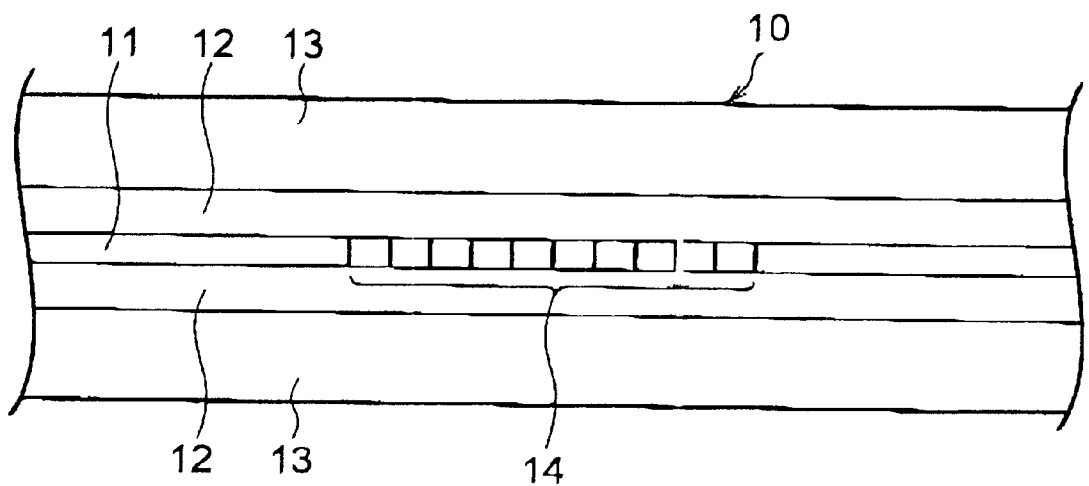
FIG. 4 is a diagram (1) showing the structure in section of the OFA taken along the line I—I shown in FIG. 1A.

FIG. 4 is a diagram showing the structure in section of the OFA 10 according to the present invention taken along the line I—I in FIG. 1A. As shown in FIG. 4, the OFA 10 comprises a core region 11 including an optical axis, an inner cladding region 12 surrounding the core region 11, and an outer cladding region 13 surrounding the inner cladding region 12. This OFA 10 also comprises a mode coupling grating 14. The mode coupling grating 14 means as a refractive index modulating region formed in a portion of the core region 11 along the longitudinal direction of the OFA 10. The mode coupling grating 14 allows signals of a core mode to propagate while remaining its mode, and works to generate a mode coupling between the inner cladding mode and core mode with respect to the pumping light. The mode coupling grating 14 is obtained by irradiating, for example, a Ge-doped core region 11 with the spatially intensity-modulated ultraviolet light.

Figure 5:
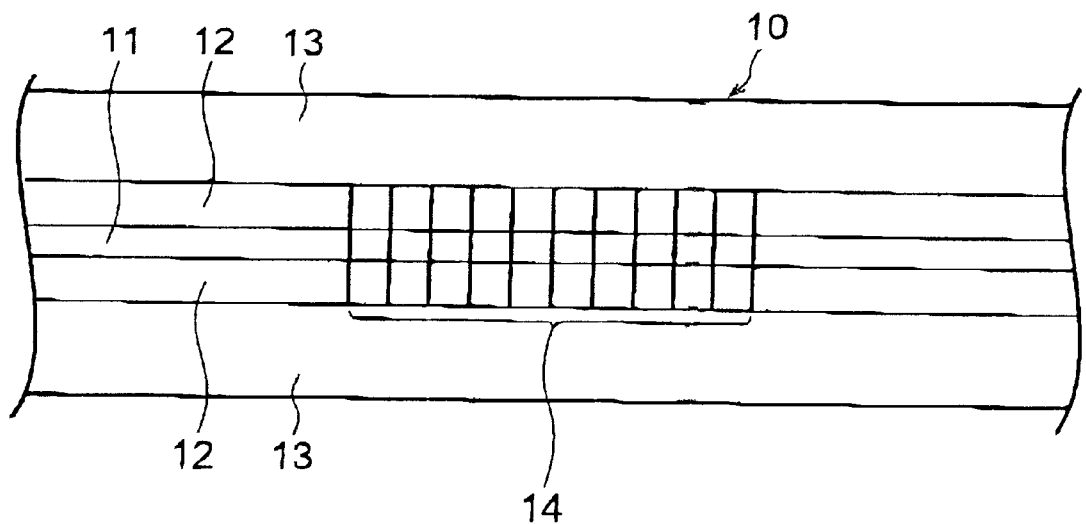
FIG. 5 is a diagram (2) showing the structure in section of the OFA taken along the line I—I shown in FIG. 1A.

The mode coupling grating 14 may be provided so as to extend over the core region 11 and inner cladding region 12 in the OFA 10 as shown in FIG. 5. The mode coupling grating 14 preferably includes a long-period grating inducing a mode coupling between the core mode and inner cladding mode whose propagation directions are the same, with respect to the pumping light. In this case, a grating period of the long-period grating is preferably 10 $\mu$m–400 $\mu$m. The mode coupling grating 14 may also include a tilted fiber Bragg grating inducing a mode coupling between a core mode and inner cladding mode whose propagation directions are contrary to each other, with respect to the pumping light. A tilted angle $\theta$ of the tilted fiber Bragg grating with respect to the optical axis AX is preferably 0.5°–20° (see FIG. 9).

In the OFA 10, a region where luminescent element is added along the longitudinal direction of the fiber, and a region where the mode coupling grating 14 is formed may overlap each other or spaced from each other. The OFA 10 may comprise a first optical fiber including a luminescent element-doped region, and a second optical fiber including a region where the mode coupling grating 14 is formed and fusion-spliced to the first optical fiber.

Figure 6:
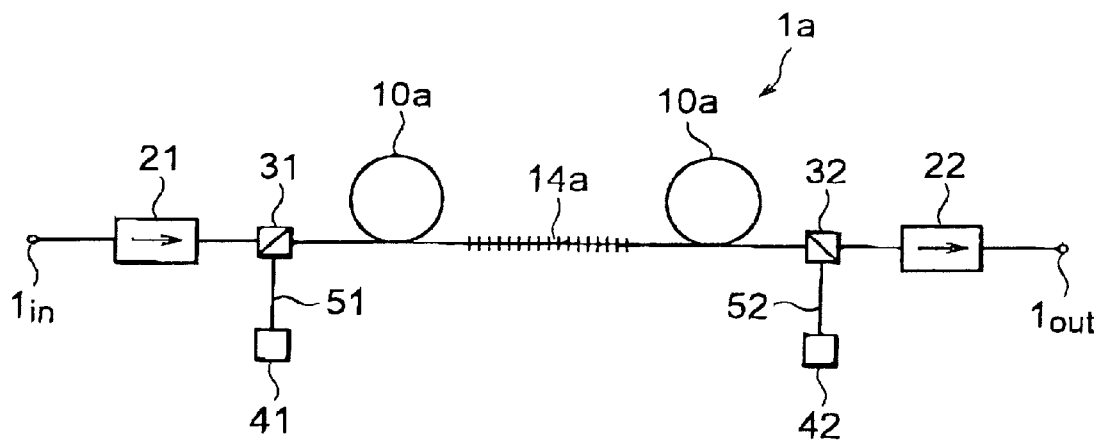
FIG. 6 is a diagram showing the structure of a first embodiment of the optical fiber amplifier according to the present invention.

A first embodiment of an optical fiber amplifier according to the present invention will now be described with reference to FIGS. 6 and 7. An OFA 10a (included in the OFA 10 according to the present invention) applied to the optical fiber amplifier 1a according to the first embodiment includes a long-period grating as a mode coupling grating 14a.

Figure 7:
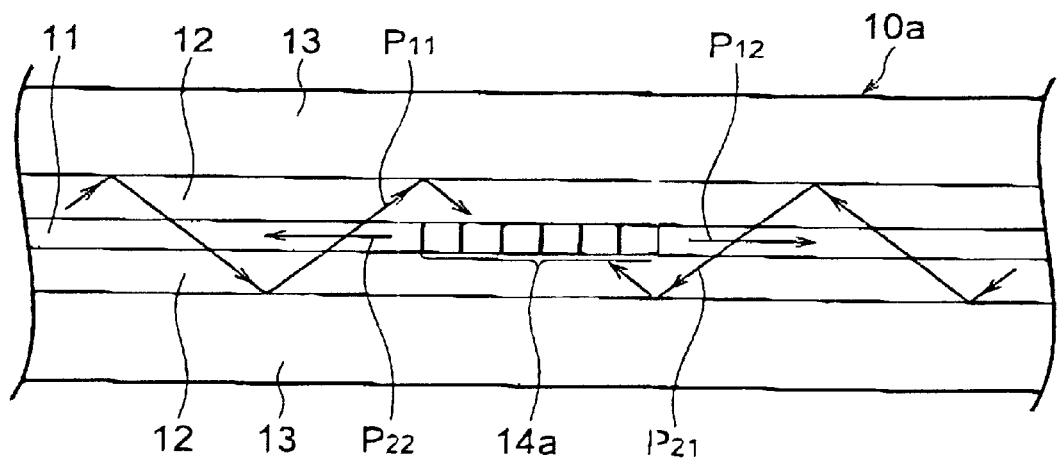
FIG. 7 is a diagram for describing a mode coupling effect of the pumping light in the OFA, in the optical fiber amplifier according to the first embodiment.

FIG. 7 is a diagram showing the construction in section of the optical fiber amplifier 1a according to the first embodiment, and corresponding to a sectional view taken along the line I—I in FIG. 1A. The optical fiber amplifier 1a comprises an optical isolator 21, a coupler 31, OFA 10a, a coupler 32 and an optical isolator 22 which are arranged in order from a signal input terminal $1_{in}$ toward a signal output terminal $1_{out}$. A pumping light source 41 for supplying pumping light to the OFA 10a is optically connected to the coupler 31, while a pumping light source 42 for supplying pumping light to the OFA 10a is optically connected to the coupler 32. The input terminal $1_{in}$ and optical isolator 21, the optical isolator 21 and coupler 31, the coupler 32 and optical isolator 22, and the optical isolator 22 and output terminal $1_{out}$ are optically connected to each other by way of optical fibers ensuring a single mode at a signal wavelength. The coupler 31 and pumping light source 41 are optically connected to each other by way of an optical fiber 51 ensuring a multi-mode at a wavelength of the pumping light. The coupler 32 and pumping light source 42 are optically connected to each other by way of an optical fiber 52 ensuring a multi-mode at the wavelength of the pumping light.

The optical isolators 21, 22 work to pass light in the direction from the input terminal $1_{in}$ toward the output terminal $1_{out}$, and not to pass light in the contrary direction. The pumping light sources 41, 42 are optical devices for outputting the pumping light. The coupler 31 outputs the pumping light, which is sent out from the pumping light source 41 and reaches the coupler 31, toward the OFA 10a together with the signals outputted from the isolator 21 and reaching the coupler 31. The coupler 32 outputs the signals, which are sent out from the OFA 10a and reach the coupler 32, toward the optical isolator 22, and it outputs the pumping light, which is sent out from the pumping light source 42 and reaches the coupler 32, toward the OFA 10a.

In the optical fiber amplifier 1a, the pumping light outputted from the pumping light source 41 is supplied to the OFA 10a by way of the optical fiber 51 and coupler 31. The pumping light outputted from the pumping light source 42 is supplied to the OFA 10a by way of the optical fiber 52 and coupler 32. Signals captured through the input terminal $1_{in}$ are inputted into the OFA 10a by way of the optical isolator 21 and coupler 31, and propagate as light of a core mode through the interior of the optical fiber 10a. The amplified signals are outputted from the OFA 10a, and finally outputted to an optical transmission line by way of the coupler 32, optical isolator 22 and output terminal $1_{out}$.

FIG. 7 is a sectional view for describing the mode coupling of the pumping light in the OFA 10a of the optical fiber amplifier 1a according to the first embodiment. The pumping light outputted from the pumping light source 41 propagates as light $P_{11}$ of an inner cladding mode in a forward direction during an initial period of the supplying of this pumping light to the OFA 10a. When this pumping light $P_{11}$ of the inner cladding mode reaches the mode coupling grating 14a (long-period grating), the inner cladding mode $P_{11}$ is converted into a core mode $P_{12}$ whose propagation direction is identical with that of the inner cladding mode $P_{11}$ by the mode coupling effect of the grating 14a. Similarly, the pumping light outputted from the pumping light source 42 propagates as light $P_{21}$ of an inner cladding mode in a backward direction during an initial period of the supplying of the pumping light to the OFA 10a. When this pumping light of an inner cladding mode $P_{21}$ reaches the mode coupling grating 14a (long-period grating), the inner cladding mode $P_{21}$ is converted into the core mode $P_{22}$ whose propagation direction is identical with that of the inner cladding mode $P_{21}$ by the mode coupling effect of the grating 14a. The pumping light of the core modes $P_{12}$, $P_{22}$ pumps the luminescent element contained in the core region 11 of the OFA 10a.

The mode coupling grating 14a may be formed on any region of the optical fiber for optical amplifier 10a along the longitudinal direction thereof, i.e., the grating 14a may be formed on a region in the vicinity of an intermediate portion of the fiber 10a, a region in the vicinity of both end portions thereof, or a region in the vicinity of one end portion thereof. Although one mode coupling grating 14a is formed in the optical fiber for optical amplifier 10a according to the first embodiment, plural mode coupling gratings may also be formed as will he described later. In such a case, the mode coupling gratings 14a are preferably formed in the region where allows the pumping light of the core modes $P_{12}$, $P_{22}$ to propagate for a longest possible period of time through the core region 11 in which the luminescent element is contained, in the OFA 10a.

In general, in the mode coupling grating 14a (long-period grating), a coupling efficiency from the inner cladding mode of the pumping light to the core mode thereof, and a coupling efficiency from the core mode of the pumping light to the inner cladding mode thereof are equal to each other. However, in the optical fiber amplifier 1a according to the first embodiment, the pumping light of a core mode is absorbed into the luminescent element contained in the core region 11, and the power thereof becomes small. Therefore, the mode coupling from the inner cladding mode of the pumping light to the core mode thereof becomes predominant, and the pumping light is converted from the inner cladding mode into the core mode and absorbed into the luminescent element.

As described above, in accordance with the optical fiber amplifier 1a of the first embodiment to which the OFA 10a are applied, the luminescent element is pumped by the pumping light propagating as light of the core modes P12, $P_{22}$. Therefore, a pumping efficiency to the luminescent element by the pumping light is high, and a signal amplification gain can be improved effectively. Since a cross-sectional shape of each glass region of the OFA 10a may be circular (the cross-sectional shape of each glass region does not need to be set non-circular), the manufacturing of the OFA 10a can be controlled with a high accuracy, and a sufficient mechanical strength thereof can be obtained. Since signals propagate as light of a core mode through the OFA 10a, a connection loss between the OFA 10a and other optical fibers can be minimized, and the pumping of a high-order mode in the latter optical fibers is held down. Therefore, the occurrence of noise in a signal wavelength band is rarely encountered.

A second embodiment of the optical fiber amplifier according to the present invention will now be described with reference to FIGS. 8 and 9. A tilted fiber Bragg grating is formed as a mode coupling grating 14b in the OFA 10b (OFA 10 according to the present invention) applied to the optical fiber amplifier 1b according to the second embodiment.

Figure 8:
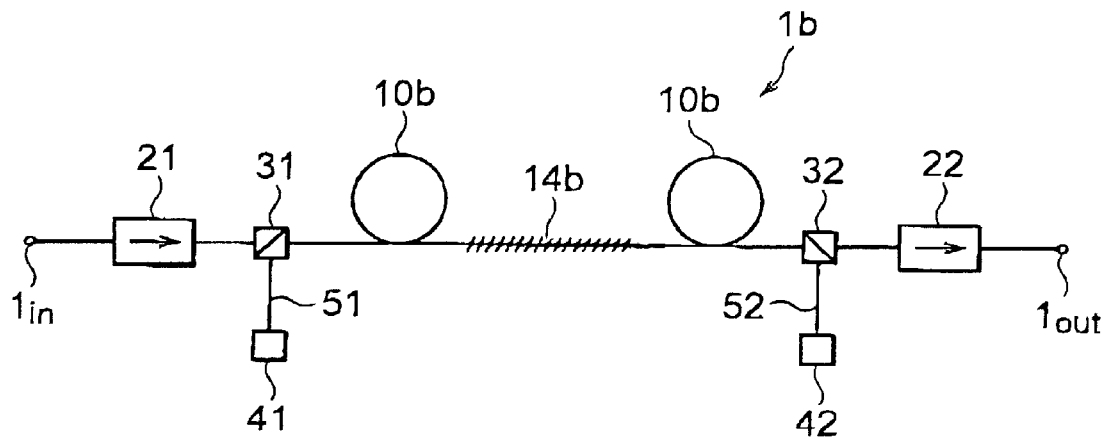
FIG. 8 is a diagram showing the structure of a second embodiment of the optical fiber amplifier according to the present invention.

FIG. 8 is a schematic structure of the second embodiment of the optical fiber amplifier according to the present invention. The optical fiber amplifier 1b according to the second embodiment comprises the OFA 10b, in which a tilted fiber Bragg grating (mode coupling grating 14b) is formed, instead of the above-mentioned OFA 10a in the optical fiber amplifier 1a according to the first embodiment (FIG. 6).

Figure 9:
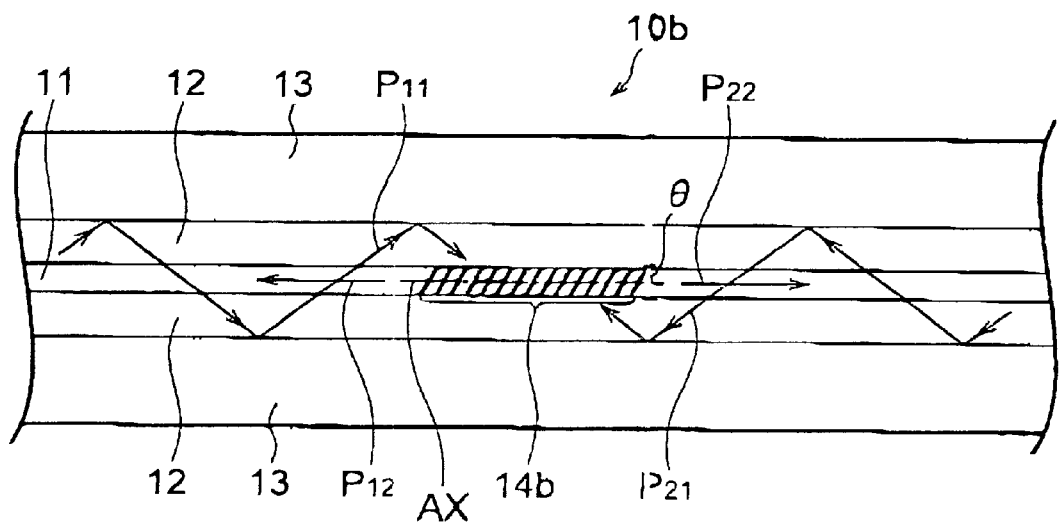
FIG. 9 is a diagram for describing a mode coupling effect of the pumping light in the OFA, in the optical fiber amplifier according to the second embodiment.

FIG. 9 is a sectional view for describing the mode coupling of the pumping light in the OFA 10b of the optical fiber amplifier 1b according to the second embodiment. The pumping light outputted from the pumping light source 41 propagates as light of an inner cladding mode $P_{11}$ in a forward direction during an initial period of the supplying of the pumping light to the OFA 10b. When this pumping light of the inner cladding mode $P_{11}$ reaches the mode coupling grating 14b (tilted fiber Bragg grating), the inner cladding mode $P_{11}$ is converted into a core mode $P_{12}$ whose propagation direction is contrary to that of the inner cladding mode $P_{11}$ by the mode coupling effect of the grating 14b. Similarly, the pumping light outputted from the pumping light source 42 propagates as light of an inner cladding mode $P_{21}$ in a backward direction during an initial period of the supplying of the pumping light to the OFA 10b. When this pumping light of the inner cladding mode $P_{21}$ reaches the mode coupling grating 14b (tilted fiber Bragg grating), the inner cladding mode is converted into a core mode $P_{22}$ whose propagation direction is contrary to that of the inner cladding mode $P_{21}$ by the mode coupling effect of the grating 14b. The pumping light of the core modes $P_{12}$, $P_{22}$ pumps the luminescent element contained in the core region 11 of the OFA 10b.

The mode coupling grating 10b may be formed on any region of the OFA 10b along the longitudinal direction thereof, i.e., the grating 14b maybe formed in a region in the vicinity of an intermediate portion of the fiber 10b, a region in the vicinity of both end portions thereof, or a region in the vicinity of one end portion thereof. Although one mode coupling grating 14b is formed in the OFA 10b also in this second embodiment, plural mode coupling gratings may also be formed. In such a case, the mode coupling gratings 14b are preferably formed in a region where allows the pumping light of the core modes P12, $P_{22}$ to propagate for a longest possible period of time through the core region 11, in which the luminescent element is contained, the OFA 10b.

In general, in the mode coupling grating 14b (tilted fiber Bragg grating), a coupling efficiency from the inner cladding mode of the pumping light to the core mode thereof, and a coupling efficiency from the core mode of the pumping light to the inner cladding mode thereof are equal to each other. However, in the optical fiber amplifier 1b according to the second embodiment, the pumping light of a core mode is absorbed into the luminescent element contained in the core region 11, and the power thereof becomes small. Therefore, the mode coupling from the inner cladding mode of the pumping light to the core mode thereof becomes predominant, and the pumping light is converted from the inner cladding mode into the core mode and absorbed into the luminescent element.

As described above, even in the optical fiber amplifier 1b according to the second embodiment, the luminescent element is pumped by the pumping light propagating as light of the core modes $P_{12}$, $P_{22}$. Therefore, a pumping efficiency for the luminescent element by the pumping light is high, and a signal gain can be improved effectively. Since a cross-sectional shape of each glass region of the OFA 10b may be circular (the cross-sectional shape of each glass region does not need to be set non-circular), the manufacturing of the OFA 10b can be controlled with a high accuracy, and a sufficient mechanical strength thereof can be obtained. Since signals propagate as light of a core mode through the OFA 10b, a splice loss between the OFA 10b and other optical fibers can be minimized, and pumping oscillation of a high-order mode in the latter optical fibers is held down. Therefore, the noise in a signal wavelength band is rarely encountered.

Concrete examples to which the first and second embodiments are applied will not be described with a comparative example. An optical fiber amplifier of an application 1 has a structure identical with that of the optical fiber amplifier 1a according to the first embodiment shown in FIG. 6, and the OFA having a region in the vicinity of an intermediate portion thereof with a long-period grating as a mode coupling grating is applied to the amplifier of this application 1. An optical fiber amplifier of an application 2 has a structure identical with that of the optical fiber amplifier 1b according to the second embodiment shown in FIG. 8, and the OFA having a region in the vicinity of an intermediate portion thereof with a tilted fiber Bragg grating as a mode coupling grating is applied to the amplifier of this applied example 2. An optical fiber amplifier of a comparative example has a structure similar to those of the optical fiber amplifiers shown in FIGS. 6 and 8 except the structure of applied OFA. This comparative example is different from the above-described applications 1 and 2 in that a mode coupling grating is not provided in the applied OFAs.

All of the OFAs in the applications 1 and 2 and comparative example have the following items. Namely outer diameters 2a, 2b of a core region and an inner cladding region are 4 μm and 35 μm, respectively, and an outer diameter of an outer cladding region a standard level of 125 μm. The relative refractive index differences $\Delta n_1$, $\Delta n_2$ of the inner cladding region and the outer cladding region respectively with respect to the inner cladding region are 1.3% and 0.35%. Each length of the optical fibers is 30 m. A wavelength of the pumping light is 0.98 μm, and the sum of the power of the pumping light supplied to the OFA in forward and backward directions is 800 mW. Through each of the applied OFAs, signals of a 1.55 μm wavelength band propagate as light of a core mode, and the pumping light of a wavelength of 0.98 μm propagates as light of a core modem or an inner cladding mode.

The OFA in the application 1 includes a long-period grating with a refractive index modulation period (grating period) of 75 μm and a length of 10 mm as a mode coupling grating. The OFA in the application 2 includes a tilted fiber Bragg grating with a refractive index modulation period (grating period) of 350 nm, a tilted angle θ (see FIG. 9) of 6.0° with respect to an optical axis AX and a length of 10 mm as a mode coupling grating.

The inventors of the present invention inputted signals of the wavelength of 1.55 μm with a predetermined level of power into an input terminal of each optical fiber amplifier having the above-described structure, and measured the power of signals outputted from an output terminal. As a result, the level of the power in the comparative example was 18.3 dBm, whereas the levels of the power in the applications 1 and 2 were 22.0 dBm and 21.8 dBm, respectively. It was thus ascertained that the amplification gains of both of the optical fiber amplifiers of the applications 1 and 2 became larger by 3.7 dB and 3.5 dB respectively than that of the optical fiber amplifier of the comparative example.

Figure 10:
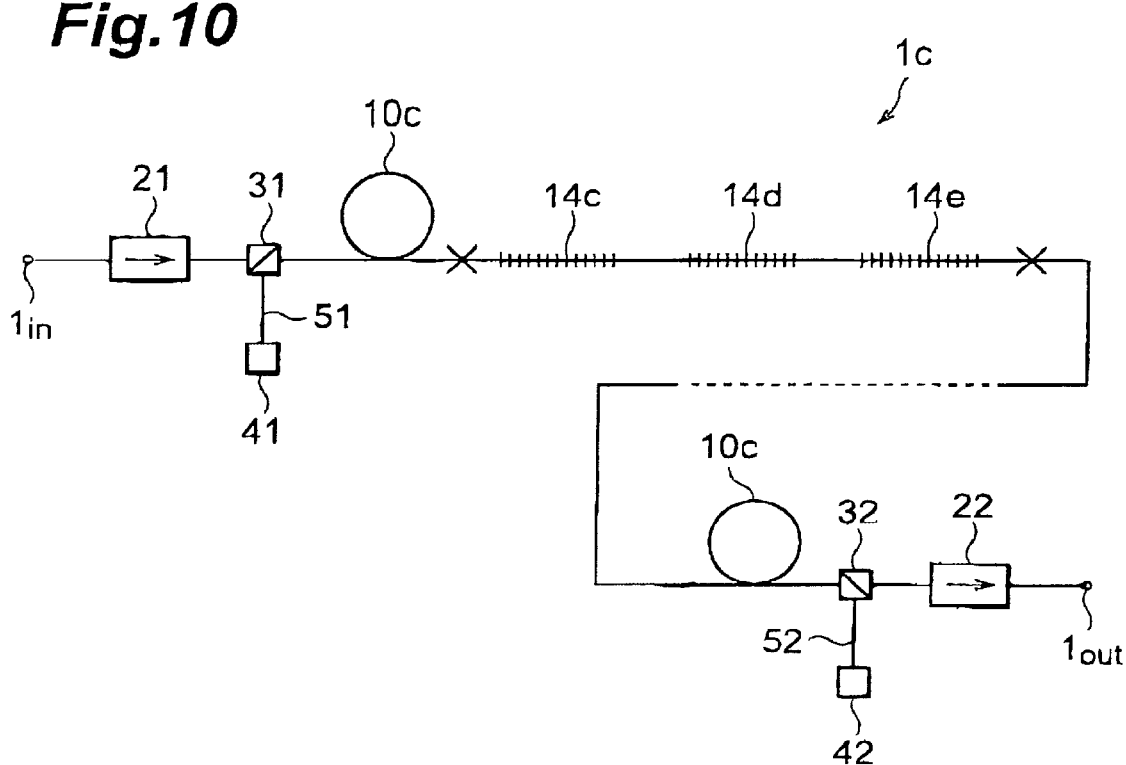
FIG. 10 is a diagram showing the structure of a third embodiment of the optical fiber amplifier according to the present invention.

FIG. 10 is a diagram showing the structure of a third embodiment of the optical fiber amplifier according to the present invention. An optical fiber amplifier 1c according to the third embodiment has a structure basically identical with that of the optical fiber amplifier according to the first embodiment, and is different from the applied OFA 10c including plural mode coupling gratings 14c, 14d, 14e. In particular, the OFA 10c in the optical fiber amplifier 1c is formed by fusion-splicing the cladding-pumped fibers each containing a signal amplifying element, such as Er, to both ends of the optical fiber in which the plural mode coupling gratings 14c, 14d, 14e are formed In the pumping light propagating through the OFA 10c, plural high-order inner cladding modes exist (see FIGS. 3B–3E). In accordance with the optical fiber amplifier 1c according to the third embodiment, these high-order inner cladding modes are respectively coupled to a core mode by plural mode coupling gratings 14c, 14d, 14e, and the pumping light supplied to the optical fiber for optical amplifier 10c can thereby be used more efficiently.

The plural mode coupling grating 14c, 14d, 14e formed in an optical fiber constituting a part of the OFA 10c may all be formed of long-period gratings, and some of them may be formed of tilted fiber Bragg gratings.

To be exact, the inventors prepared an OFA, on which a long-period grating with a grating period of 75 μm and a length of 10 mm constituting the mode coupling grating 14c, a long-period grating with a grating period of 70 μm and a length of 10 mm constituting the mode coupling grating 14d, and a long-period grating with a grating period of 64 μm and a length of 10 mm constituting the mode coupling grating 14e were formed, as the OFA 10c applied to the third embodiment, and they measured output signal power of the prepared OFA 10c. The measuring conditions are the same as those used in the application 1.

As a result, it was ascertained that the output signal power was 22.9 dBm, and that an amplification gain further increased as compared with that in the optical fiber amplifier of the application 1. The reasons why these advantages are obtained in that the optical fiber amplifier 1c according to the third embodiment can couple inner cladding modes with the core mode more than the optical fiber amplifier 1a (application 1 having only one mode coupling grating) according to the first embodiment.

Figure 11:
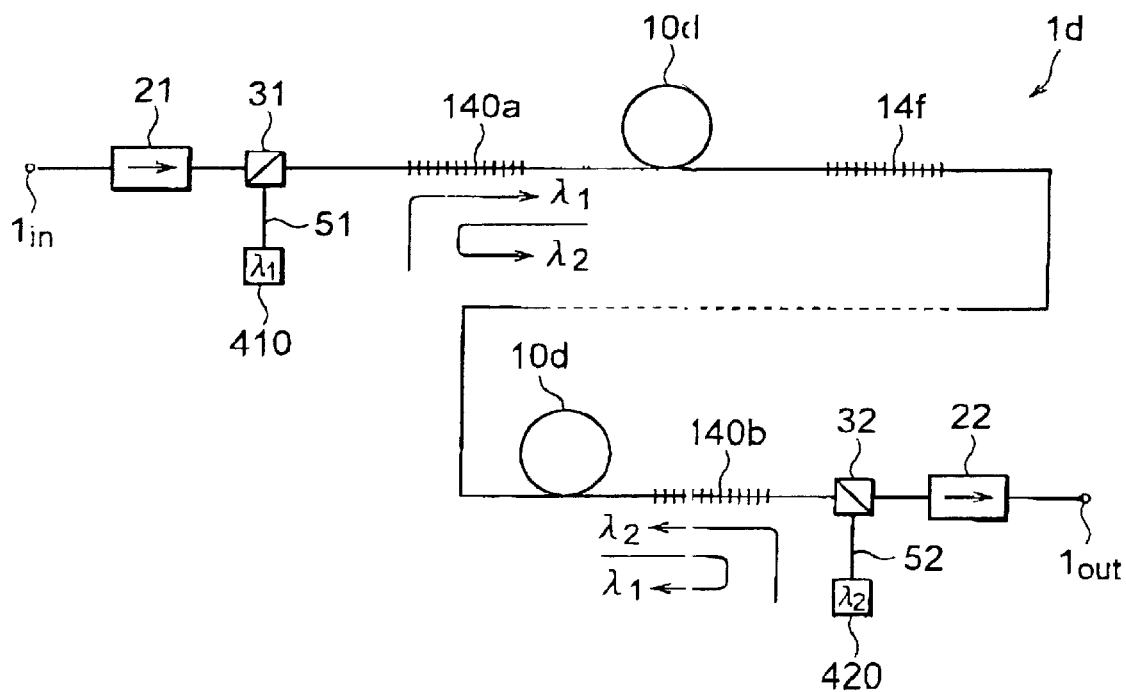
FIG. 11 is a diagram showing the structure of a fourth embodiment of the optical fiber amplifier according to the present invention.

FIG. 11 is a diagram showing the structure of a fourth embodiment of the optical fiber amplifier according to the present invention. The optical filer amplifier according to the fourth embodiment basically has the same structure as that 1a according to the first embodiment, and comprises pumping light sources 410, 420 outputting pumping light of wavelengths $\lambda_1$ and $\lambda_2$ different from each other and an OFA 10d in which fiber Bragg gratings 140a, 140b reflecting light of a predetermined wavelength are formed so as to arranged so as to sandwich a mode coupling grating 14f therebetween.

The mode coupling grating 14f may be formed of either a long-period grating or a tilted fiber Bragg grating. Each of the fiber Bragg gratings 140a, 140b, may be a grating reflecting light of a predetermined wavelength, or a tilted fiber Bragg grating induces a mode coupling.

In particular, in this fourth embodiment, the grating 140a works to pass the pumping light of a wavelength $\lambda_1$ therethrough, and to reflect the pumping light of a wavelength $\lambda_2$ thereupon. The grating 140b works to reflect the pumping light of a wavelength $\lambda_1$ thereupon, and pass the pumping light of a wavelength $\lambda_2$ therethrough. In the case of a structure in which the pumping light of different wavelengths $\lambda_1$ $\lambda_2$ is supplied from both ends of the OFA 10c, the fiber Bragg gratings having a light reflecting function are provided on the portions where are close to both ends thereof, and this enables the pumping light to be used effectively.

To be exact, the inventors measured a level of output signal power of the optical fiber amplifier 1d, which uses the pumping light of the wavelength of 0.97 μm and the pumping light of the wavelength of 0.985 μm, as a fourth embodiment. Prepared OFA 10d includes a long-period grating with a grating period of 77 μm and a length of 10 mm, and a long-period grating with a grating period of 75 μm and a length of 10 mm as a mode coupling grating 14f. The OFA 10d is further includes a Bragg grating with a grating period of 338 μm and a length of 10 mm as a grating 140b reflecting the pumping light of a wavelength $\lambda_1$, and a Bragg grating with a grating period of 333 μm and a length of 10 mm as a grating 140a reflecting the pumping light of a wavelength $\lambda_2$. The measuring conditions are the same as those used in the application 1.

As a result, it was ascertained that the output signal power was 22.4 dBm, and that an amplification gain further increased as compared with that in the optical fiber amplifier of the application 1. The reasons why these advantages are obtained reside in that the optical fiber amplifier 1d according to the fourth embodiment is formed so that this amplifier 1d can utilize the pumping light more efficiently than the optical fiber amplifier 1a (application 1 having only one mode coupling grating) according to the first embodiment.

A first embodiment of the optical fiber laser according to the present invention will now be described with reference to FIG. 12. OFA 10e applied to the optical fiber laser 2 according to this embodiment includes a mode coupling grating 14g (long-period grating or a tilted fiber Bragg grating) in the same manner as the optical fiber amplifiers 1a–1d according to the first to fourth embodiments.

Figure 12:
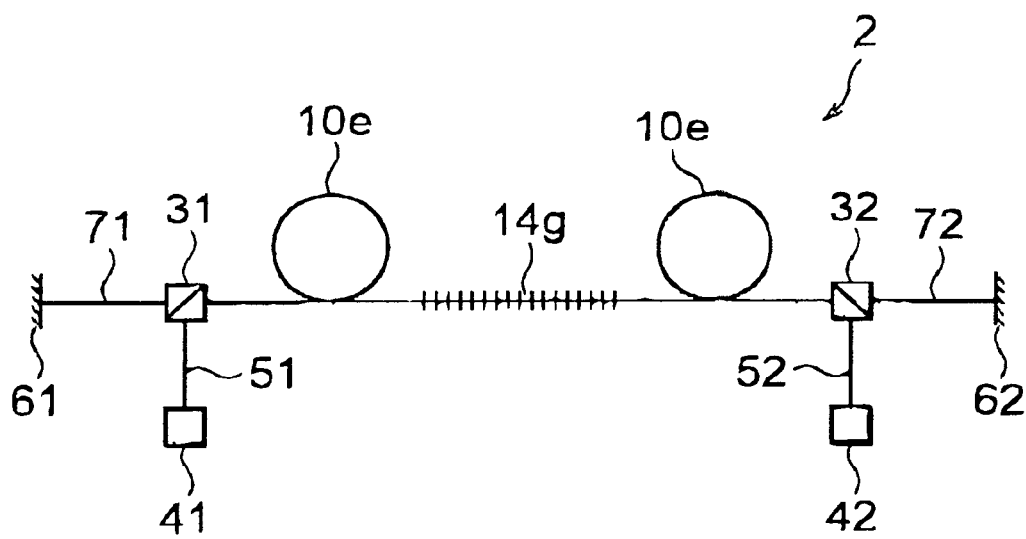
FIG. 12 is a diagram showing the structure of an embodiment of the fiber optic laser resonator according to the present invention.

FIG. 12 is a diagram showing the structure of this embodiment of the optical fiber laser 2. The optical fiber laser 2 comprises an optical fiber 71, a coupler 31, OFA 10e, a coupler 32 and an optical fiber 72 which are arranged in order from a high reflectance mirror 61 toward a low reflectance mirror 62. A pumping light source 41 is optically connected to the coupler 31, and a pumping light source 42 the coupler 32. Each of the optical fibers 71, 72 ensures a single mode at a signal wavelength (oscillation wavelength). The coupler 31 and pumping light source 41 are optically connected to each other by way of an optical fiber 51 which ensures a multi-mode at a pumping light wavelength. The coupler 32 and pumping light source 42 ire optically connected to each other by way of an optical fiber 52 which ensures a multi-mode at a pumping light wavelength.

The coupler 31 outputs signals from the optical fiber 71 toward the OFA 10e, signals from the OFA 10e toward the optical fiber 71, and the pumping light from the pumping light source 41 toward the OFA 10e. The coupler 32 outputs signals from the OFA 10e toward the optical fiber 72, signals from the optical fiber 72 toward the OFA 10e, and the pumping light from the pumping light source 42 toward the OFA 10e.

In the optical fiber laser 2, the pumping light outputted from the pumping light source 41 is supplied to the OFA 10e by way of the optical fiber 51 and coupler 31. On the other hand, the pumping light outputted from the pumping light source 42 is supplied to the OFA 10e by way of the optical fiber 52 and coupler 32. The pumping light propagates as light of an inner cladding mode curing an initial period of the supplying of the pumping light to the OFA 10e in the same manner as in the actions described with reference to FIGS. 7 and 9. When the pumping light of the inner cladding mode reaches the mode coupling grating 14g, the inner cladding mode is converted into a core mode by the mode coupling effect of the grating 14g. The pumping light of the core mode pumps the luminescent element contained in the core regions of the OFA 10e.

When the luminescent element contained in the core regions of the OFA 10e is pumped by the pumping light, the luminescent element emits spontaneous emission light. This spontaneous emission light propagates as light of a core mode through the OFA 10e and optical fibers 71, 72, and travels forward and backward in a Fabry-Perot resonator constituted by the high reflectance mirror 61 and low reflectance mirror 62. While the spontaneous emission light propagates through the OFA 10e, induced emission light occurs to cause laser oscillation. A part of this induced emission light is outputted as a laser beam to outside from the low reflectance mirror 62.

The mode coupling grating 14g may be formed on any region of the OFA 10e along with the longitudinal direction thereof, i.e., the grating may be formed in regions in the vicinity of intermediate portions of the fiber 10e, regions in the vicinity of both end portions thereof, or regions in the vicinity of one end portion thereof. Although one mode coupling grating 14g is formed in the OFA 10e applied to this embodiment, plural mode coupling gratings may also be provided. In such a case, the optical fiber for optical amplifier 10e preferably includes the mode coupling gratings 14g in a region where allows the pumping light of the core mode to propagate for a longest possible period of time through the core region containing the luminescent element.

In general, in the mode coupling grating 14g, a coupling efficiency from the inner cladding mode of the pumping light to the core mode thereof, and a coupling efficiency from the coupling of the core mode of the pumping light to the inner cladding mode thereof are equal to each other. However, in this embodiment of the optical fiber laser 2, the pumping light of a core mode is absorbed into the luminescent element contained in the core region, and the power thereof becomes small. Therefore, a mode coupling from the inner cladding mode to the core mode becomes predominant, and the pumping light is converted from the inner cladding mode into the core mode and absorbed into the luminescent element.

As described above, in accordance with the optical fiber laser to which the OFA 10e is applied, the luminescent element is pumped by the pumping light propagating therethrough as light of the core mode. Therefore, a pumping efficiency for the luminescent element by the pumping light is high, and a laser oscillation efficiency can be effectively improved. Since a cross-sectional shape of each glass region of the OFA 10e may be circular (the cross-sectional shape of each glass region need not to be set non-circular), the manufacturing of the OFA 10e can be controlled with a high accuracy, and a sufficient mechanical strength of the fiber can be obtained. Since the signals (included in induced emission light) propagate as light of the core mode through the OFA 10e, a splice loss between the OFA 10e and other optical fibers is reduced to a low level, so that the pumping of a high-order mode of the latter fibers is held down. As a result, the noise figure of a signal wavelength band is rarely encountered.

As described above, since the OFA having a mode coupling grating are provided in the present invention, the pumping light initially introduced into the optical fiber for optical amplifier therefore propagates as light of an inner cladding mode, but when this pumping light of an inner cladding mode reaches the mode coupling grating, the inner cladding mode is converted into a core mode by the mode coupling effect of the mode coupling grating and this pumping light of a core mode pumps the luminescent element contained in the core region of the OFA. On the other hand, signals introduced into the OFA pass as light of a core mode through the mode coupling grating while remaining its mode, and amplified signals are obtained.

Therefore, the luminescent element is pumped efficiently by the pumping light propagating as light of a core mode. Accordingly, the pumping efficiency for the luminescent element by the pumping light becomes high, and a signal amplification gain can be improved, Since the cross-sectional shape of each glass region of the OFA may be circular, it becomes possible to control the manufacturing of the optical fiber with a high accuracy, and obtain a sufficiently high mechanical strength of the optical fiber. Moreover, since signals propagate as light of a core mode through the OFA, a splice loss between the OFA and other optical fibers is reduced to a low level, and the pumping of a high-order mode in the latter optical fiber is also held down. Therefore, the noise figure in signal wavelength is rarely encountered.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber for an optical amplifier for amplifying signals propagating therethrough by using pumping light supplied thereto, said optical fiber for optical amplifier comprising:

a core region extending along a predetermined axis and having a first refractive index, said core region having a structure ensuring a single mode with respect to said signals and at least a part doped with an element for signal amplification;

an inner cladding region provided on the periphery of said core region, and having a second refractive index lower than said first refractive index, said inner cladding region having a structure ensuring a multi-mode with respect to said pumping light;

an outer cladding region provided on the periphery of said inner cladding region and having a third refractive index lower than said second refractive index; and one or more mode coupling gratings passing core mode signals therethrough, and inducing a mode coupling between an inner cladding mode and a core mode with respect to said pumping light.

2. An optical fiber for an optical amplifier according to claim 1, wherein said inner cladding region is doped with said element for signal amplification.

3. An optical fiber for an optical amplifier according to claim 1, wherein at least one of said mode coupling gratings includes a long-period grating inducing a mode coupling between said inner cladding mode and said core mode whose propagation direction is identical with that of said inner cladding mode.

4. An optical fiber for an optical amplifier according to claim 3, wherein a grating period of said long-period grating is 10 $\mu$m–400 $\mu$m.

5. An optical fiber for an optical amplifier according to claim 1, wherein at least one of said mode coupling gratings includes a tilted fiber Bragg grating inducing a mode coupling between said inner cladding mode and said core mode whose propagation direction is contrary to that of said inner cladding mode.

6. An optical fiber for an optical amplifier according to claim 5, wherein said tilted fiber Bragg grating tilts at 0.5°–20° to said predetermined axis.

7. An optical fiber for an optical amplifier according to claim 1, further comprising fiber Bragg gratings each selectively reflecting light of a predetermined wavelength, said fiber Bragg gratings being provided so as to sandwich said one or more mode coupling gratings.

8. An optical fiber for an optical amplifier according to claim 7, wherein each of said fiber Bragg gratings includes one of a Bragg grating and a tilted Bragg grating having a predetermined inclination angle with respect to said predetermined axis.

9. An optical fiber amplifier, comprising:

an optical fiber for optical amplifier according to claim 1; and one or more pumping light sources for supplying pumping light to said optical fiber for optical amplifier.

10. An optical fiber amplifier according to claim 9, wherein said one or more pumping light sources supply pumping light of wavelengths different from each other.

11. An optical fiber laser, comprising:

an optical fiber for optical amplifier according to claim 1;

one or more pumping light sources for supplying pumping light to said optical fiber for optical amplifier; and a resonator for resonating amplified signals from said optical fiber for optical amplifier.

12. An optical fiber laser according to claim 11, wherein said one or more pumping light sources supply pumping light of wavelengths different from each other.

* * * * *